(12) United States Patent
Fitts

(10) Patent No.: US 6,676,182 B2
(45) Date of Patent: Jan. 13, 2004

(54) VEHICLE BED STORAGE EXTENDER

(76) Inventor: Todd M. Fitts, 17819 Kuecken, Clinton Township, MI (US) 48038

( * ) Notice: Subject to any disclaimer, the term of this patent is extended or adjusted under 35 U.S.C. 154(b) by 0 days.

(21) Appl. No.: 09/838,426

(22) Filed: Apr. 19, 2001

(65) Prior Publication Data

US 2002/0153737 A1 Oct. 24, 2002

(51) Int. Cl.[7] .................................................. B60R 9/06
(52) U.S. Cl. .................... 296/26.11; 296/37.6; 224/403; 224/404
(58) Field of Search .............................. 296/37.6, 26.08, 296/26.1, 26.11, 57.1; 224/402, 403, 404

(56) References Cited

U.S. PATENT DOCUMENTS

| | | | |
|---|---|---|---|
| 5,456,511 A | * | 10/1995 | Webber ..................... 296/57.1 |
| 5,468,038 A | * | 11/1995 | Sauri ....................... 296/26.11 |
| 5,752,800 A | * | 5/1998 | Brincks et al. ............ 296/26.11 |
| 5,788,311 A | * | 8/1998 | Tibbals ..................... 296/26.11 |
| 5,911,464 A | * | 6/1999 | White ....................... 296/26.11 |
| 5,924,753 A | * | 7/1999 | DiBassie ................... 296/26.1 |
| 6,019,410 A | * | 2/2000 | Trostle et al. ............. 296/26.11 |
| 6,340,190 B1 | * | 1/2002 | Rosebrugh et al. ....... 296/26.11 |
| 6,367,858 B1 | * | 4/2002 | Bradford ................... 296/26.11 |
| 6,401,995 B1 | * | 6/2002 | Yuille et al. ............... 224/404 |
| 6,422,630 B1 | * | 7/2002 | Heaviside .................. 296/57.1 |
| 6,425,618 B1 | * | 7/2002 | Garland et al. ............ 296/26.11 |
| 2002/0000732 A1 | * | 1/2002 | Sanders .................... 296/26.08 |
| 2002/0023938 A1 | * | 2/2002 | Kmita et al. ............... 224/403 |
| 2002/0096901 A1 | * | 7/2002 | Iafrate et al. ............. 296/26.11 |

\* cited by examiner

Primary Examiner—Dennis H. Pedder
Assistant Examiner—H. Gutman
(74) Attorney, Agent, or Firm—Gregory T. Zalecki

(57) ABSTRACT

A device extends the storage bed of a vehicle and creates a storage receptacle at multiple locations on top of the storage bed. Adjustable length side walls are pivotally attached to an end wall to form an open top box. Two walls pivotally attached to each other and to the end wall allow formation of a storage receptacle when desired. The adjustability of the side walls permits the open top box, whether it is used to extend the storage bed, create a storage receptacle on top of the storage bed or both, to make optimal use of the storage space between the wheel wells of the vehicle and its raised tailgate, as well as to make optimal use of the additional storage bed space created by lowering the tailgate. Storage receptacles created by the open top box may be subdivided into multiple smaller storage receptacles.

14 Claims, 10 Drawing Sheets

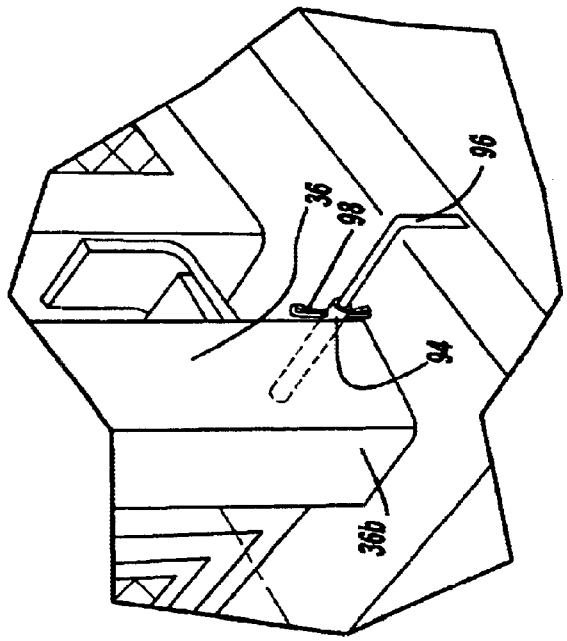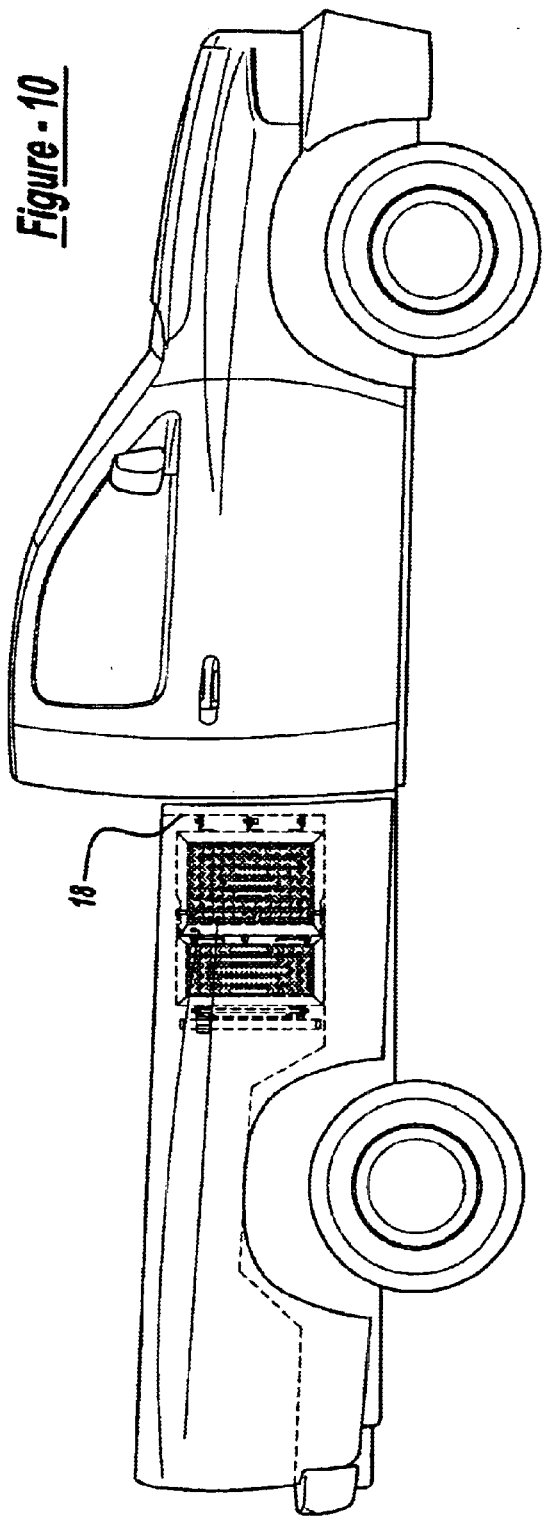

VEHICLE BED STORAGE EXTENDER

BACKGROUND

Many vehicles have storage beds. One of the most common types of such a vehicle is a pickup truck having a cab with a storage bed behind it. The purpose of the vehicle storage bed is to allow storage and transportation of loads such as construction material, machinery, sporting goods, groceries and numerous other types of personal property.

The vehicle storage bed is a substantially rectangular planar area defined by a front panel adjacent to the rear of the vehicle cab, two vehicle side panels and a tailgate. Typically, the vehicle storage bed has two wheel wells protruding into the storage area. The wheel wells provide space for the rear vehicle tires to rotate without interference from the vehicle storage bed. The length and width of the vehicle storage bed, the distance from the rearmost point of the wheel wells to the tailgate and the tailgate height are of standardized dimensions on most modern pickup trucks.

The material desired to be transported often is too long to fit within the vehicle storage bed when the vehicle storage bed is closed by the tailgate being in the up position. Therefore, the tailgate is often lowered to permit larger loads to be carried within the vehicle storage bed. Since the tailgate is down in such a configuration a substantial risk of the load: falling out resulting in property loss or physical injury is created. In addition, some types of loads, such as construction drywall, may be damaged because of the lack of vehicle bed support under a portion of the load.

At times the vehicle user needs to subdivide the vehicle storage bed into smaller storage areas. For example, the user may desire to confine a bag of groceries or a bag of golf clubs to a much smaller area than the area of the vehicle storage bed. The most common locations where subdivided storage areas are desired are: between the wheel wells and a raised tailgate, over a lowered tailgate and adjacent to the vehicle cab.

A number of vehicle bed extenders have been developed. Some serve the dual purposes of extending the vehicle storage bed and creating subdivided storage spaces within the storage bed. Some are foldable to provide easier storage when not in use.

One of the problems common to all known devices that both extend the vehicle storage bed in one mode and provide subdivided storage spaces in another mode is that the dimensions are the same in both modes. This creates a problem because the distance between the rearmost portion of the wheel wells and the raised tailgate is usually less than the height of the tailgate. Therefore, if the device has fixed dimensions which allow it to fit between the wheel wells and the tailgate in storage mode, it will not take full advantage of the additional vehicle bed storage space created when the tailgate is down and the device is used in extender mode. To take full advantage of all vehicle bed space available between the wheel wells and the tailgate when the device is used in storage mode, and at the same time, when the device is used as a vehicle bed extender, take full advantage of the additional vehicle bed storage space created when the tailgate is down, the length of the vehicle bed storage extender along the longitudinal axis of the vehicle must be variable rather than fixed.

Information relevant to attempts to address these problems can be found in U.S. Pat. Nos. 4,472,639, 4,856,840, 5,456,511, 5,458,389, 5,678,743, 5,700,047, 5,752,636, 5,775,759, 5,816,638, 5,820,188, 5,823,597, 5,902,000, 5,924,753, 6,019,410 and 6,120,076. However, each one of these references lacks one or more of the features listed in the next paragraph.

There is a need for a vehicle bed storage extender with the following features It would extend the vehicle storage bed over the entire surface area of the lowered tailgate. It would provide additional vehicle storage bed extension when it's rearmost retaining wall is lowered into a horizontal position coplanar with the vehicle storage bed. It would provide subdivided storage spaces over the entire vehicle bed storage area between the rearmost portion of the wheel wells and the raised tailgate. It would provide subdivided storage spaces over the entire additional vehicle bed space created by the lowering of the tailgate. It would provide subdivided storage spaces adjacent to the vehicle cab. It's length along the longitudinal axis of the vehicle would be variable in either storage or extender mode. It would be portable and easily storable. It would be foldable into a slim rectangular package when not in use. It would have a low manufacturing cost. It could be manufactured from a variety of materials including steel, aluminum and plastic. It would be easily installable and removable from the vehicle. It would be easily packageable for shipping. It would be one integral piece.

SUMMARY

The present invention is directed to a device that satisfies these needs. The invention is intended for use on vehicles having a storage bed. Such vehicles have a cab which serves as a passenger compartment. The storage bed is positioned on a horizontal plane behind the cab. A vertically oriented front panel is located adjacent to the rear of the vehicle cab at the front of the storage bed. Two vertically oriented side panels are located along the side perimeters of the storage bed. The storage bed is enclosed by a vertically oriented tailgate located at the rear of the storage bed and the rear of each side panel. The storage bed can be opened by lowering the tailgate into a horizontal or down position.

The vehicle bed storage extender comprises an end wall, two variable length side walls attached to the end wall and one or more vehicle mounts attached to each side wall. The variable length side walls are attached to the end wall such that the end wall and side walls form a three sided open top box. The open top box is sized to extend the bed of the vehicle when the tailgate of the vehicle is down. This is accomplished by securing the open top box over the tailgate with the end wall being positioned over the rear of the tailgate.

The variable length walls can be adjusted to permit the open top box to be positioned between a raised tailgate and wheel wells protruding into the storage bed. In this configuration the end wall is oriented forward of the side walls and the tailgate. Thus a storage area is created on top of the storage bed between the wheel wells and the tailgate. Since the distance between the wheel wells and the tailgate is usually less than the height of the tailgate, the variable length walls permit the open top box to be sized optimally whether the device is used to extend the vehicle bed by being placed over a lowered tailgate, or whether the device is used to create a storage area on top of the storage bed. The open top box can also be used to create a storage area on top of the vehicle bed at other locations, such as adjacent to the front panel behind the vehicle cab.

The ends of the side walls which are not attached to the end wall are free. One or more vehicle mounts are attached to the free end of each side wall. The three sided open top box is secured to the vehicle by securing the vehicle mounts to the rear ends of the side panels. It can also be secured to the vehicle by securing the vehicle mounts to the front panel behind the vehicle cab, thereby creating a forward storage area.

The variable length side walls can be adjusted to multiple lengths. One version of the invention uses dual length side walls instead of variable length side walls. A dual length side wall is a type of a variable length side wall which can be adjusted to two predetermined lengths.

Preferably, the device, known as a vehicle bed storage extender, has side walls which are pivotally attached to the end wall. This will permit the side walls to be folded into a position parallel and adjacent to the end wall, thereby forming a compact easily storable structure.

Preferably, the vehicle bed storage extender further comprises a second wall and a third wall. The second wall is pivotally connected to the end wall. The second wall is sized to folding fit adjacent and parallel to the end wall. The third wall is pivotally connected to the second wall. The third wall is sized to folding fit adjacent and parallel to the second wall and the end wall. The third wall is further configured with the end wall, the second wall and the side walls to allow formation of a rectangular storage area.

In another version of the invention a plurality of locking dividers are pivotally attached to the second wall. The dividers are attached such that they may be folded into a position parallel and adjacent to the second wall when their use is not desired. When the dividers are locked in a position perpendicular to the second wall they will create additional storage receptacles. Thus the single storage area created by the three sided open top box may be subdivided into additional storage receptacles.

The end wall may be pivotally attached to the bottom of each side wall and detachable from the top of each side wall. This will permit the end wall to pivot into a position substantially coplanar with the vehicle tailgate when the tailgate is in its down position, thus further extending the vehicle bed when the vehicle bed storage extender is positioned over the tailgate with the end wall oriented rearward.

Another version of the invention comprises two cornerposts, an end wall, two side wall assemblies and means for locking the end wall to each cornerpost when the end wall and side wall assemblies are configured as a three sided open top box. Each cornerpost has a side wall face, a back face and an end wall face. The end wall is rotatably connected to the bottoms of the end wall face of each cornerpost. The side wall assemblies are each pivotally attached to the side wall face of each respective cornerpost. Each side wall assembly comprises a first side wall subassembly, a second side wall subassembly having two vertical wall sides, one or more vehicle mounts and means locking the first side wall subassembly to the second side wall subassembly. Each second side wall subassembly is sized and pivotally attached to a first side wall subassembly such that the side wall assembly is capable of having two distinct lengths when the end wall and side wall assemblies are configured as: a three sided open top box. The vehicle mounts are attached to each vertical wall side of each second side wall subassembly. Means for locking the first side wall subassembly to the second side wall subassembly of each side wall assembly are provided to form a locked wall. Means for locking the end wall to the end wall face of each cornerpost when the end wall and side wall assemblies are configured as a three sided open top box are also provided.

DRAWINGS

These and other features, aspects, and advantages of the present invention will become better understood with regard to the following description, appended claims, and accompanying drawings where:

FIG. 6a is an enlarged view of a lower cornerpost section of the vehicle bed storage extender of FIG. 6 showing how a tube, a rod and a pin are used to prevent lateral movement of the vehicle bed storage extender in extender mode.

FIG. 10 is a side elevation view of a pickup truck showing the vehicle bed storage extender of FIG. 5 in forward storage mode.

DESCRIPTION

Figure 1:
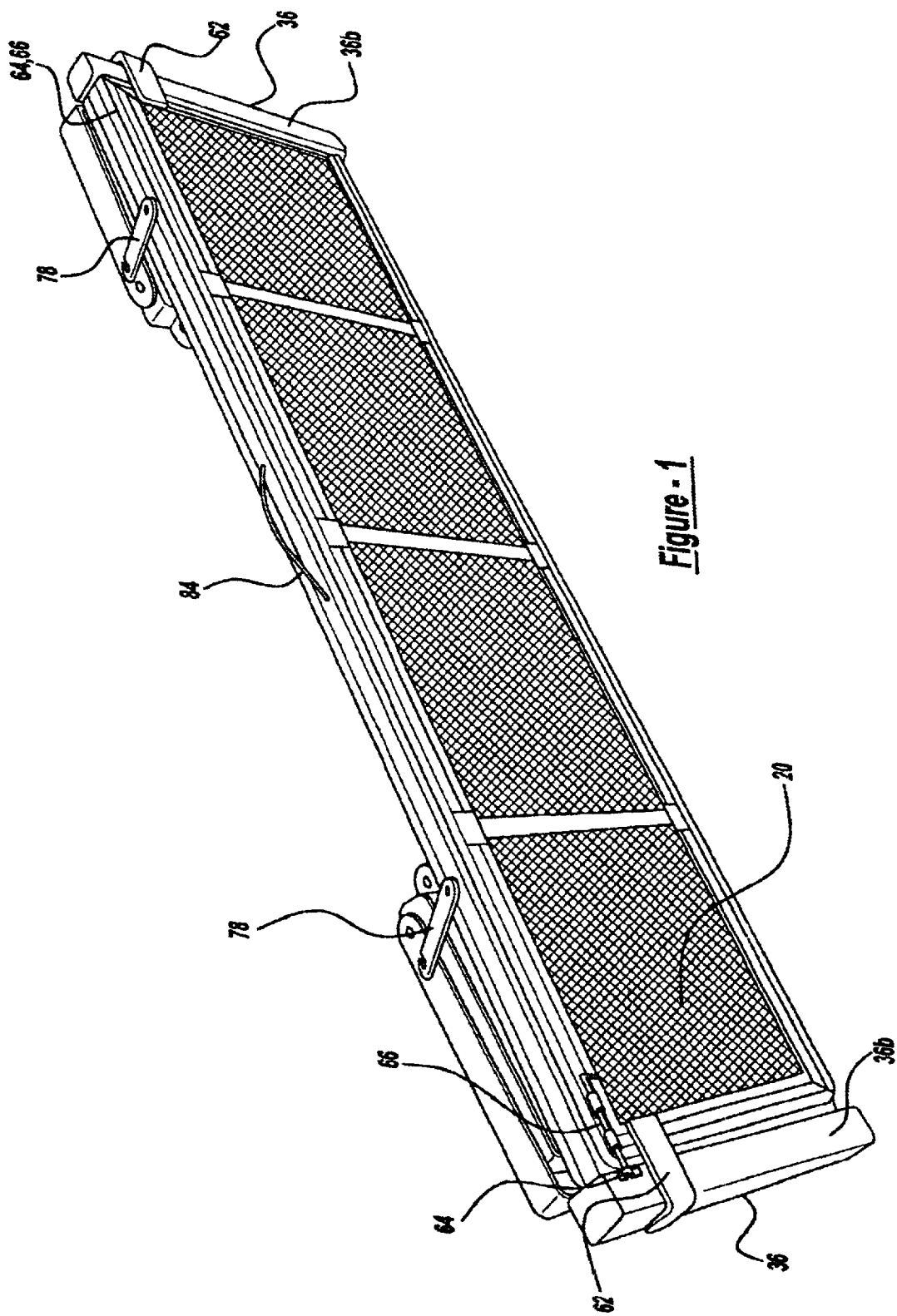
FIG. 1 is a perspective view of a preferred embodiment of a vehicle bed storage extender.
Figure 2:
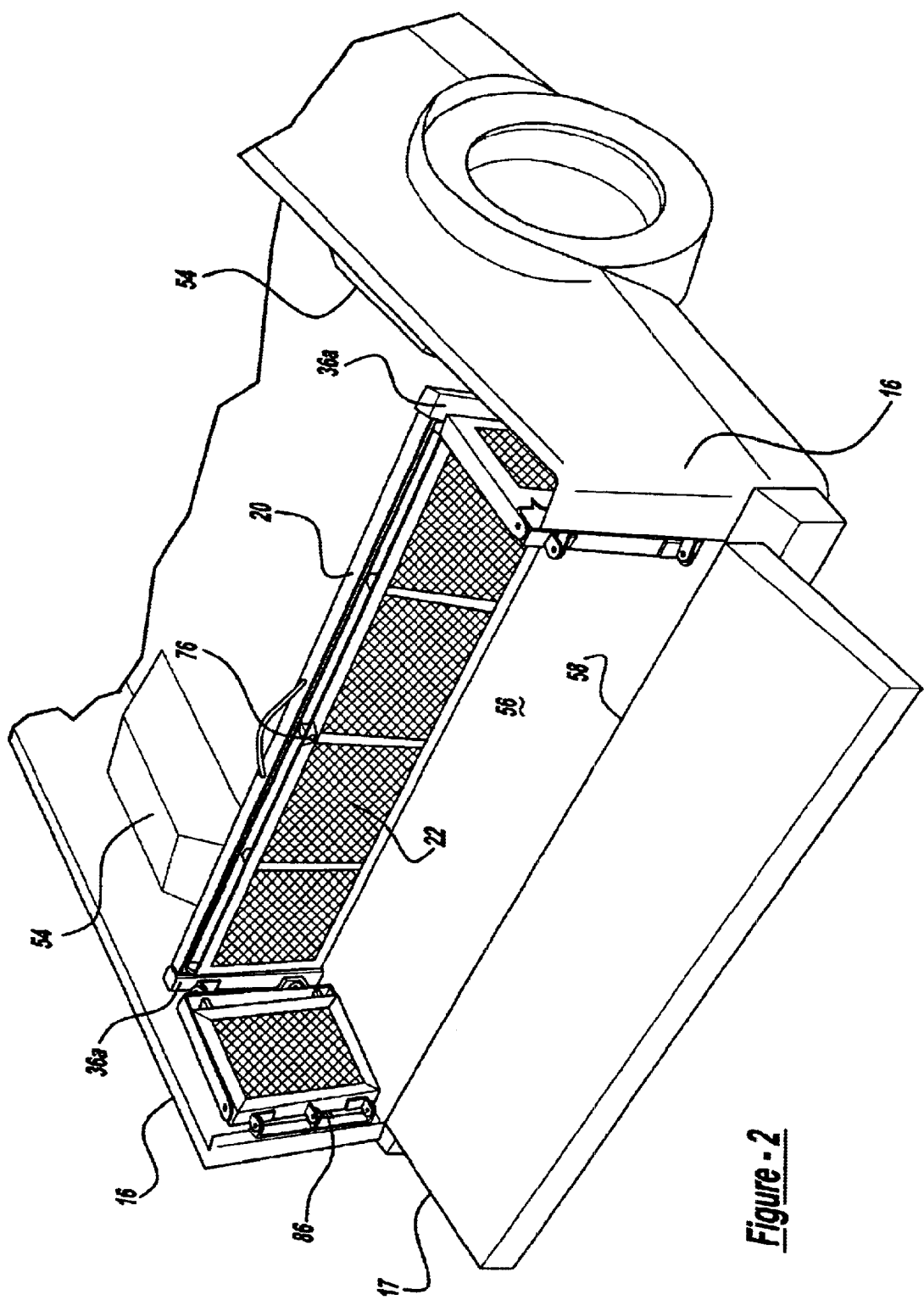
FIG. 2 is a perspective view of the vehicle bed storage extender of FIG. 1, positioned over the vehicle storage bed, oriented with its end wall forward and its folded side walls mounted to the vehicle side panels.

The preferred embodiment of this invention is shown in FIGS. 1 through 9. The invention is intended for use on a vehicle having a storage bed 56 having a rear end 58, two side panels 16, a front panel 18, and a tailgate 17. The tailgate 17 pivots between an up position and a down position. In the up position, the tailgate is secured to the two side panels 16 of the vehicle storage bed to form an open top box configuration with the storage bed side panels 16 and front panel 18 adjacent to the rear of the vehicle cab. In the down position, the tailgate 17 forms a rearward extension of the storage bed as shown in FIG. 2.

A primary element of the vehicle bed storage extender is an end wall 20. Its preferred height is the height of the vehicle side panels. It has flanges 20a and 20b along its top and two sides, respectively, sized to allow a second wall 22 and a third wall 24 to fit within it. It has a plurality of locking orifices 26 along its upper periphery for receiving locking pins.

The second wall 22 is sized to fit within the end wall 20 as shown in FIG. 2. The second wall 22 has a flange 22a on each side. The second wall 22 is pivotally connected to the end wall 20 at the intersecting bottoms 21 of the end wall side flanges 20b and second wall side flanges 22a by a pivot pin 28 inserted at each intersecting bottom 21.

Figure 3:
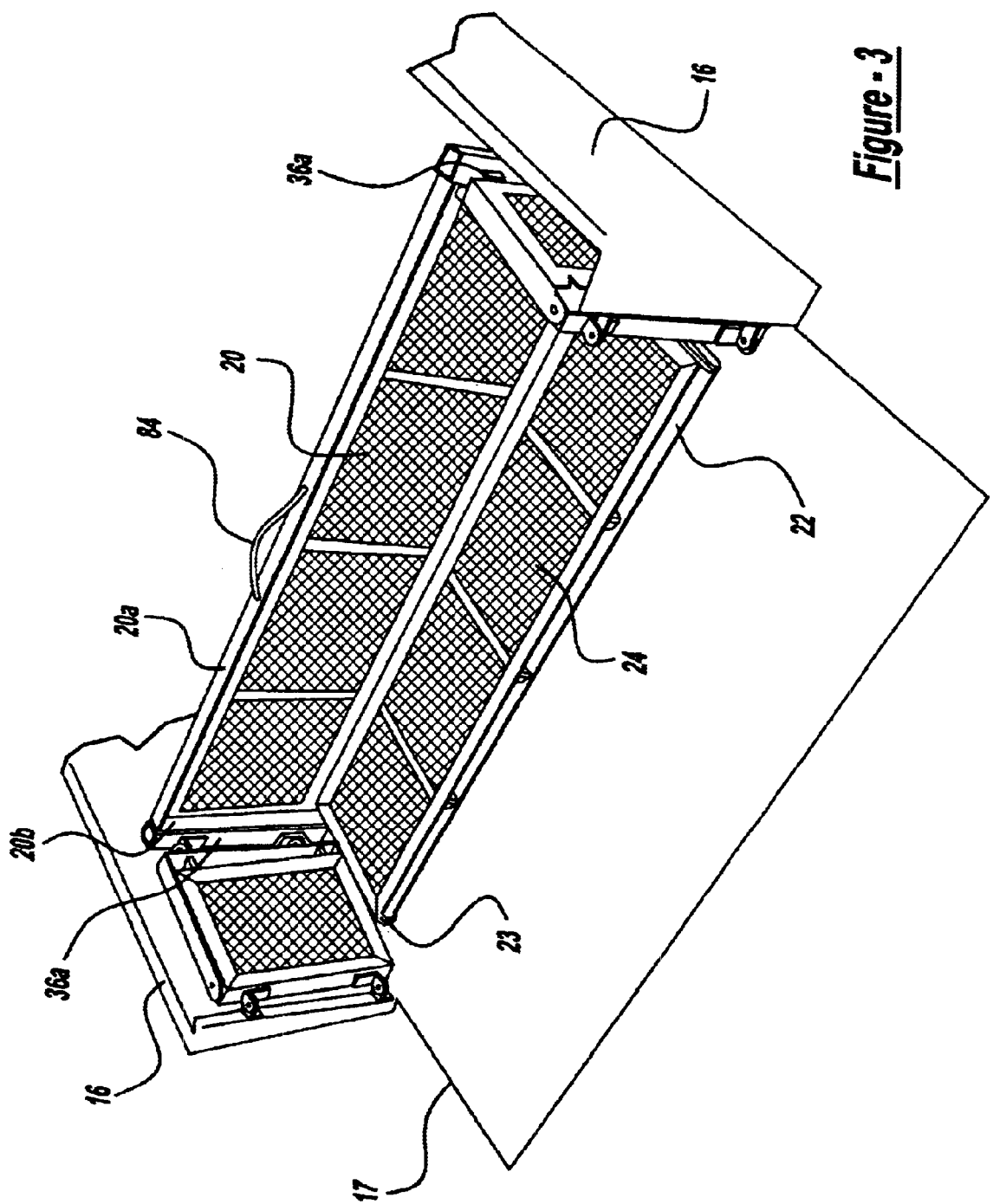
FIG. 3 is a perspective view of the vehicle bed storage extender of FIG. 2, with its second wall, containing the third wall, folded down.
Figure 4:
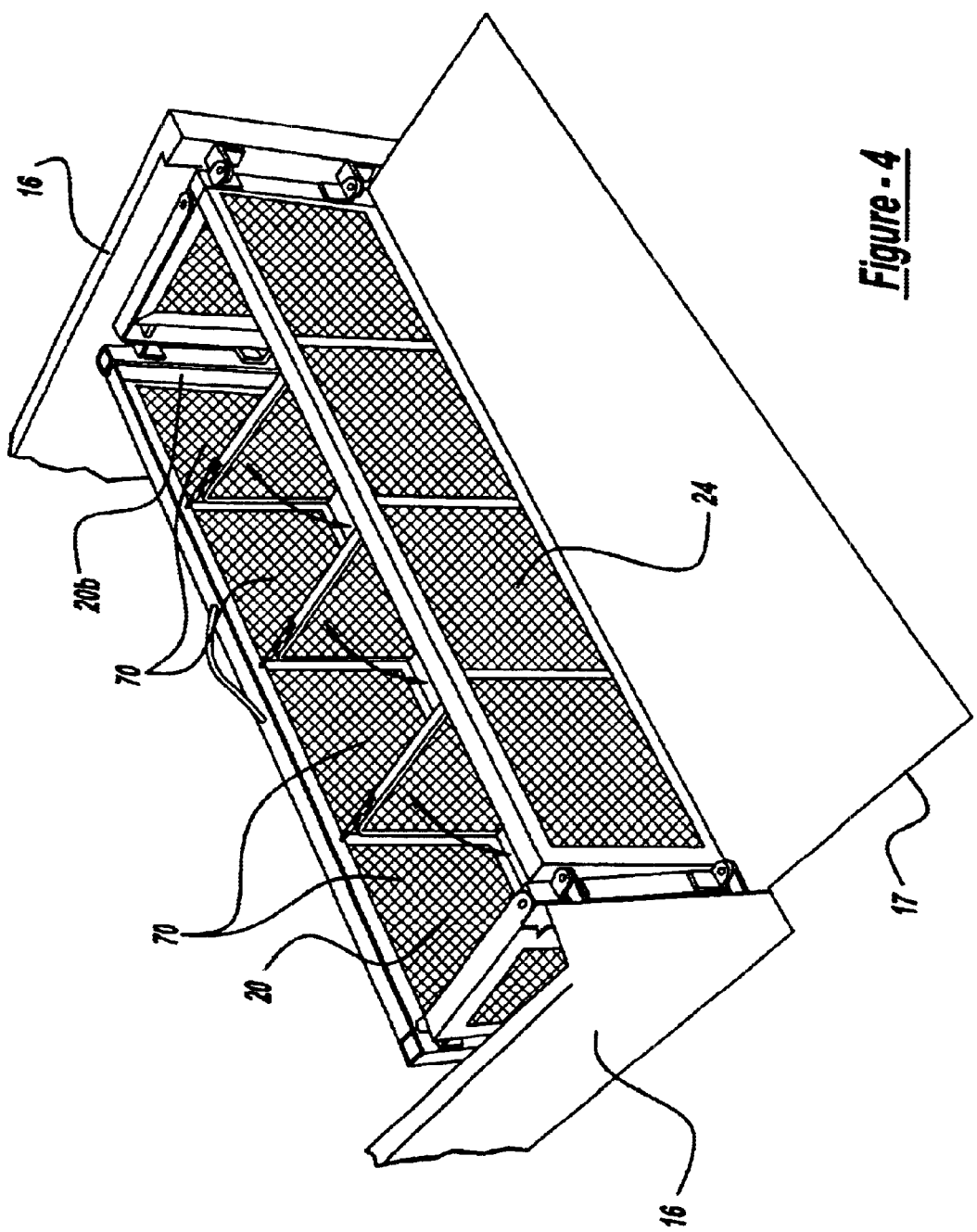
FIG. 4 is a perspective view of the vehicle bed storage extender of FIG. 3, with its second wall, third wall and dividers configured to create storage receptacles.
Figure 6:
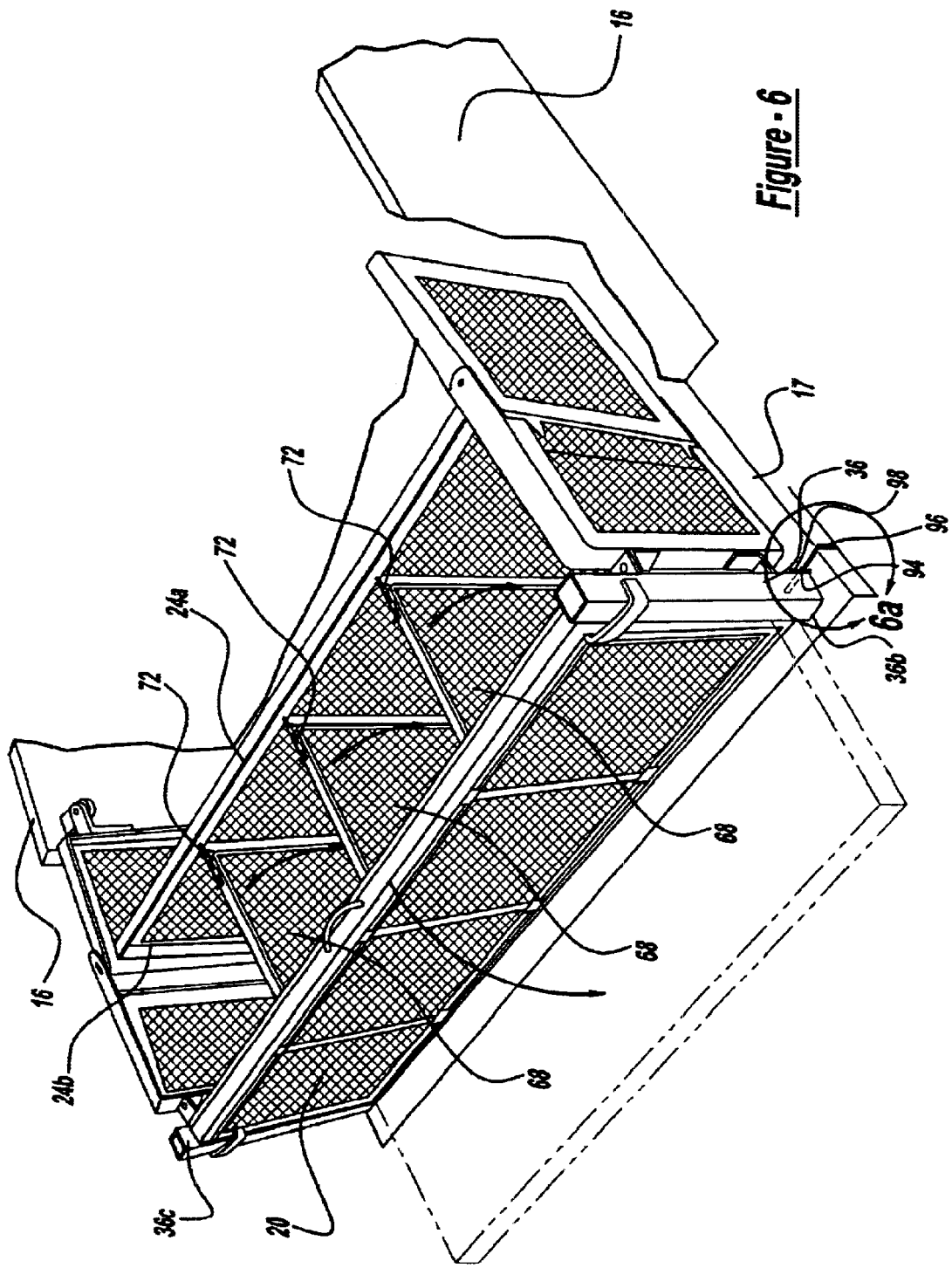
FIG. 6 is a perspective view of the vehicle bed storage extender of FIG. 5, with its second wall, third wall and dividers configured to create storage receptacles.
Figure 9:
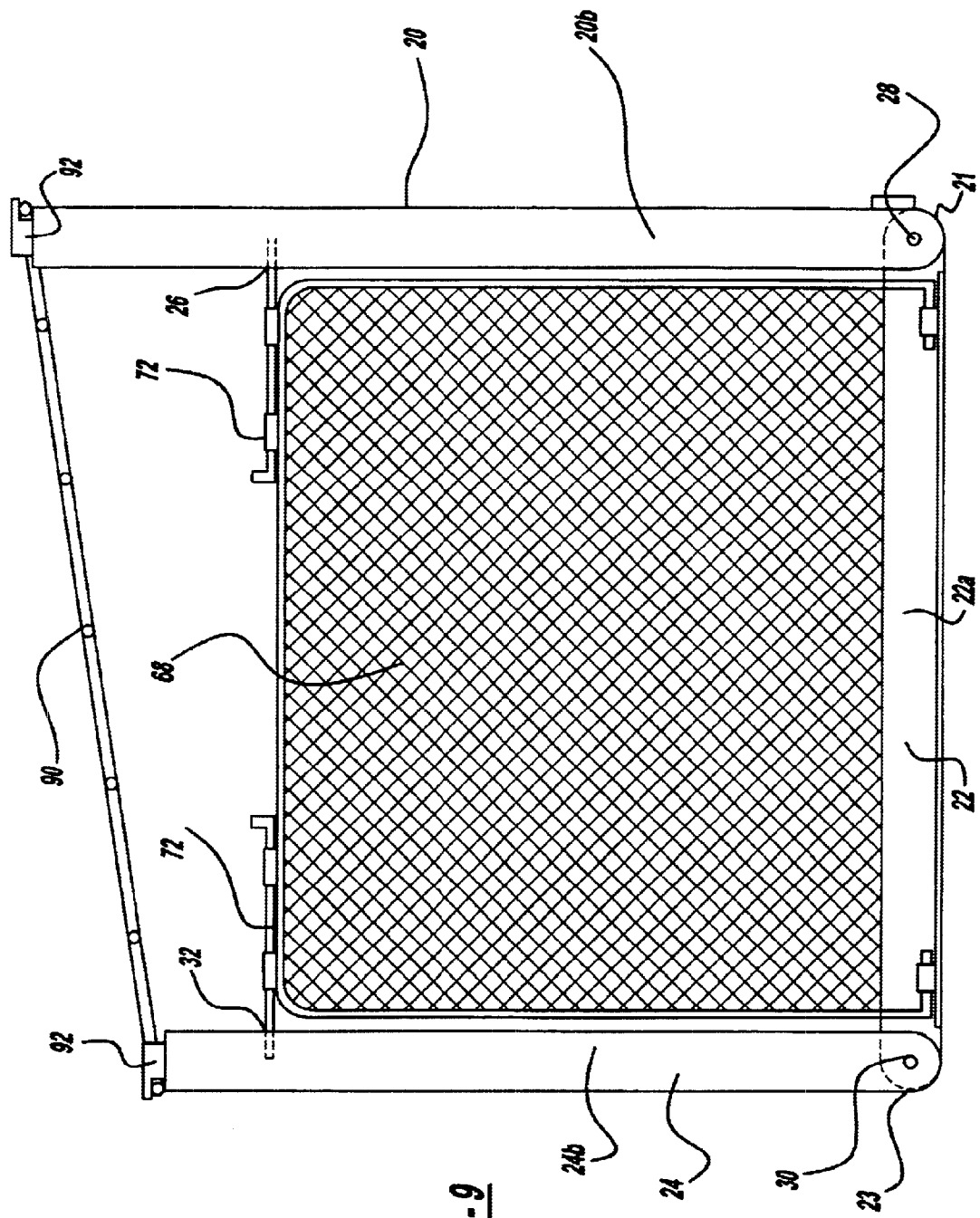
FIG. 9 is a sectional side elevation view of the vehicle bed storage extender of FIG. 8, showing a divider locked into place to create a storage receptacle.

The third wall 24 is sized to fit within the second wall 22 as shown in FIG. 3. It has flanges 24a and 24b along its top and sides, respectively. The third wall 24 contains a plurality of locking orifices 32 along its upper periphery for receiving locking pins. It is pivotally connected to the second wall 22 at the points 23 where the third wall side flanges 24b intersect the second wall side flanges 22a by a pivot pin 30 inserted through the intersection points 23, thereby permitting parallel orientation of the third wall 24 with respect to the end wall 20 as shown in FIGS. 4, 6 and 9, permitting the third wall 24 to fold within the second wall 22 as shown in FIG. 3, and further permitting the folded third wall 24 and second wall 22 to fold within the end wall 20 as shown in FIG. 2.

Two cornerposts 36 each have a side wall face 36a, a back face 36b and an end wall face 36c. The cornerposts are rotatably attached at their bottoms to the corresponding intersecting bottoms of the end wall 20 and second wall 22 by the end wall to second wall pivot pins 28 to allow the end wall 20 and the second wall 22 to pivot along an axis connecting the bottoms of the cornerposts 36.

Figure 7:
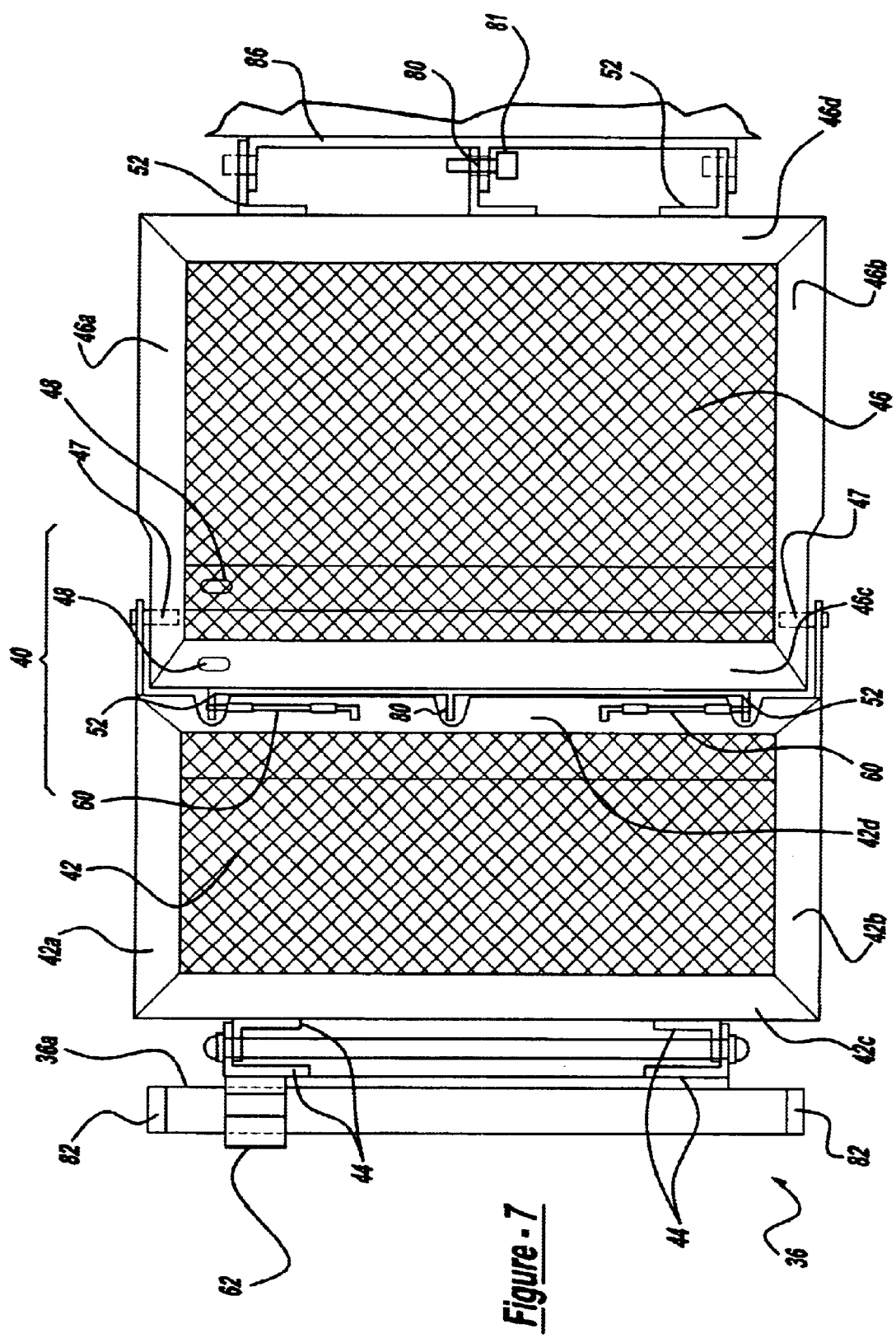
FIG. 7 is a side elevation view of an unfolded side wall, mounted perpendicularly to a side panel of the vehicle, to show how the vehicle bed storage extender of FIG. 1 is mounted to the vehicle.
Figure 8:
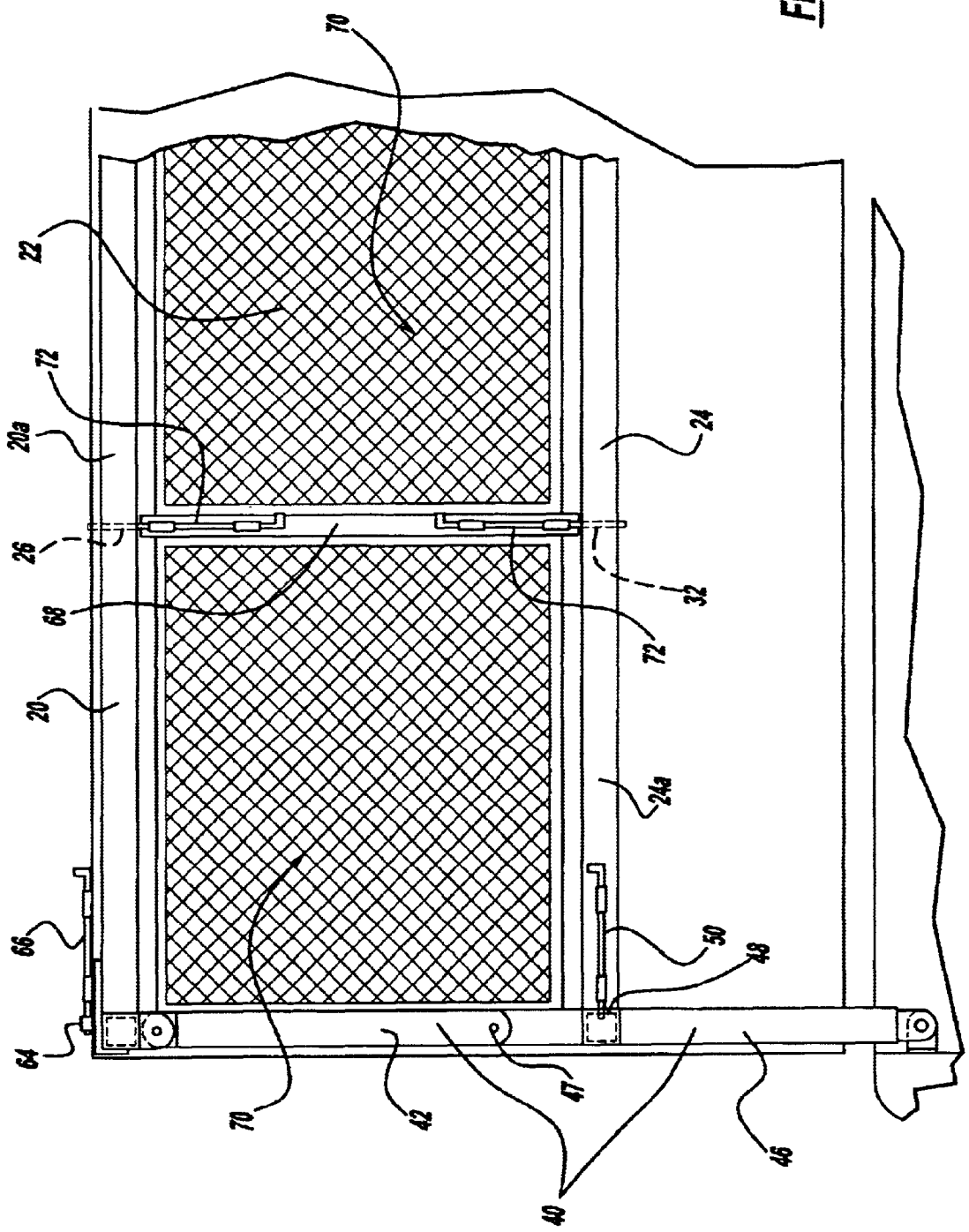
FIG. 8 is a top plan view of the vehicle bed storage extender of FIG. 6.

The preferred embodiment includes two side wall assemblies 40. Two first side wall subassemblies 42 each have two horizontal wall flanges 42a and 42b, one vertical wall flange 42c and a notched wall back 42d. A hinge 44 is attached to each first side wall subassembly vertical wall flange 42c and to the side wall face 36a of each corresponding cornerpost 36, permitting each side wall assembly 40 to fold into a position adjacent to the end wall 20. Each hinge 44 also permits each first side wall subassembly 42 to be positioned perpendicular to the end wall 20. Two second side wall subassemblies 46 each have two horizontal wall flanges 46a and 46b and two vertical wall flanges 46c and 46d. Each second side wall subassembly 46 is sized to fold within a first side wall subassembly 42. Each second side wall subassembly 46 contains locking orifices 48 to receive locking pins 50 mounted to each upper corner of the third wall 24. Each second side wall subassembly 46 is pivotally connected to a first side wall subassembly 42 by a pin 47 such that the second side wall subassembly 46 may be pivoted to fold within the first side wall subassembly 42. The second side wall subassembly locking orifices 48 are positioned to permit stabilization of the third wall 24 irrespective of whether the second side wall subassembly 46 is in an open or closed position. Two vehicle mounts 52 and a locking bracket 80 are attached to the first vertical wall flange 46c of each second side wall subassembly 46. Two vehicle mounts 52 and a locking bracket 80 are also attached to the second vertical wall flange 46d of each second side wall subassembly 46. The locking bracket 80 is used to lock the vehicle storage bed extender to the vehicle. The notches within the wall back 42d of the first side wall subassembly 42 are sized to accept the vehicle mounts 52 and locking bracket 80 whereby each second side wall subassembly 46 may rotate into an open or closed position with respect to the attached first side wall subassembly 42 without interference between the first side wall subassembly 42 and the vehicle mounts 52 attached to the second side wall subassembly 46 or interference between each first side wall subassembly 42 and the locking bracket 80. Two vehicle mounts 52 and a locking bracket 80 are similarly attached to the second vertical wall flange 46d of each second side wall subassembly 46. The distance from the back face 36b of each cornerpost 36 to the distal end of each first vertical wall flange 46c of the respective second side wall subassembly vehicle mount 52, when that second side wall subassembly 46 is pivoted to fit within its respective first side wall subassembly 42 is equal to the distance between the rear end of the wheel wells 54 within the vehicle bed 56 and the rear end 58 of the vehicle bed 56. The distance from the back face 36b of each cornerpost 36 to the second vertical wall flange 46d of the respective second side wall subassembly 46, when that second side wall subassembly 46 is unfolded and pivoted into its other position, as shown in FIG. 7, is equal to the height of the vehicle tailgate 17, which is also the length of the vehicle bed extension when the vehicle tailgate 17 is lowered to its down or horizontal position. Each first side wall subassembly 42 and each second side wall subassembly 46 contain means 60 for locking the first side wall subassembly 42 to the second side wall subassembly 46 to maintain alignment of the side wall subassemblies 42, 46 and to prevent relative rotation of the side wall subassemblies 42, 46 with respect to each other. Thus, variable length side walls are created.

In this version of the invention the side wall assemblies vary between two lengths. In other words, dual length side wall assemblies, which are a type of variable length side wall assemblies, have been described. The shorter length is the optimum length of the side wall assemblies 40 when the vehicle bed storage extender is intended to be used between the wheel wells 54 of the vehicle and the vehicle tailgate 17. This is described as storage mode below. The longer length is the optimum length of the side wall assemblies 40 when the vehicle bed storage extender is intended to be used over a lowered tailgate 17. This is described as extender mode below.

A version of the invention may also be constructed with variable length side walls which can be adjusted to any length between a set minimum length and a set maximum length. The first side wall subassembly and the second side wall subassembly would be configured to be slidable relative to one another. They would be slidable in substantially the same plane. When the desired length is obtained by sliding the first side wall subassembly relative to the second side wall subassembly, the side wall subassemblies would be secured to one another. Many methods are known for securely fixing slidable walls to one another. These include securing the walls together by way of one or more set screws, securing the walls together with clamps and securing the walls together with nuts and bolts. Products using such variable length walls are commonly available. Such products include child safety gates, animal gates and sliding doors.

The use of variable length side walls in a vehicle bed storage extender allows the vehicle bed storage extender to make full use of the space between the wheel wells of a vehicle having a storage bed and the raised tailgate of the vehicle and, also, to make full use of the additional vehicle bed storage space created when the vehicle tailgate is lowered.

A pair of brackets 62 are mounted to the upper corners of the end wall 20 for aligning the end wall 20 with the cornerposts 36, limiting the pivotal movement of the end wall 20 with respect to the cornerposts 36 and limiting the movement of the cornerposts 36 with respect to the end wall 20, the second wall 22 and each side wall assembly 40.

Means for locking and stablizing the end wall 20 with respect to the cornerposts 36 includes a locking pin bracket 64 which is attached to the upper end of the back face 36b of each cornerpost 36 and a locking pin 66 which is attached to each rear upper corner of the end wall 20 and which is aligned with its respective cornerpost locking pin bracket 64, for stabilizing the end wall 20 with respect to the cornerposts 36.

A plurality of dividers 68 are pivotally attached to the inner aspect of the second wall 22 creating storage areas 70 when locked in a position perpendicular to the second wall 22, the end wall 20 and the third wall 24. The dividers 68 are sized to fold adjacent and parallel to the second wall 22 when not being used to create storage areas 70. The dividers 68 are sized such that when they are so folded they permit the second wall 22 to be folded adjacent and parallel to the end wall 20 without interference from the dividers 68. A pair of locking pins 72 are attached to the upper corner edges of each divider 68. Each locking pin 72 is aligned with a corresponding locking pin orifice 26 on the end wall 20 or a corresponding locking pin orifice 32 on the third wall 24 thereby allowing each divider to be locked into an upright position simultaneously perpendicular to the end wall 20, the second wall 22 and the third wall 24.

A locking pin 50 is attached to each upper corner edge of the third wall 24. Corresponding locking orifices 48 on each second side wall subassembly 46 are aligned with the third wall locking pins 50 such that the third wall 24 can be locked in an upright orientation perpendicular to each second side wall subassembly 46.

A latch 76 is attached to the middle of the end wall 20 for retaining the folded third wall 24 and second wall 22 within the end wall 20.

A latch 78 is mounted to each upper corner of the end wall 20 for retaining the folded side wall assemblies 40 adjacent and parallel to the end wall 20, second wall 22 and third wall 24 when those walls are folded together.

Resilient cornerpost caps 82 are attached to each end of each cornerpost 36 for protecting the vehicle bed and preventing foreign materials from entering the inside of the cornerposts 36.

A handle 84 is attached to the center of the end wall top flange 20b for carrying the vehicle bed storage extender.

Means for engagingly accepting and securely retaining the second side wall subassembly vehicle mounts 86 are mounted to rear ends of the side panels 16 of the vehicle bed 56. Preferably, each such means comprises a bracket having an upper horizontal projection, a lower horizontal projection and a middle projection as shown in FIGS. 3 and 7. The upper and lower horizontal projections have vertically oriented pins. The upper and lower horizontal projections and vertically oriented pins are shaped and positioned to mate with the vehicle mounts 52 for securing the vehicle bed storage extender to the vehicle side panels 16. The middle projection is shaped and positioned to mate with the corresponding locking bracket 80. The means for engagingly accepting and securely retaining the second side wall subassembly vehicle mounts 86 will securely retain the vehicle bed storage extender to the vehicle irrespective of whether or not the vehicle bed storage extender is positioned on top of the vehicle storage bed 56 or on top of the tailgate 17. Means for engagingly accepting and securely retaining the second side wall subassembly vehicle mounts 86 may also be attached to the front panel 18 adjacent to the rear of the vehicle cab. This allows the vehicle bed storage extender to be mounted in the frontal area of the vehicle storage bed.

Additional means for engagingly accepting and securely retaining the second side wall subassembly 46 to the vehicle are known. The vehicle side panels 16 typically have pins mounted in their upper rear areas. These pins are configured to mate with latches positioned on each upper side of the vehicle tailgate 17. Brackets with U-shaped openings can be mounted on the upper portion of each second side wall subassembly 46 and positioned to fit over the side panel pins thereby securely retaining the vehicle bed storage extender to the vehicle after it is placed into the desired position.

Another approach involves mounting spring loaded projection interlocks to each second side wall subassembly 46. Apertures are drilled into the vehicle side panels 16 at positions aligned with the interlock projections when the vehicle bed storage extender is in a desired position. The vehicle bed storage extender is then placed into its approximate desired position. The interlock projections are then retracted, positioned to release into their respective apertures on the vehicle side panels 16 and then released, thereby securing the vehicle bed storage extender to the vehicle.

Support cords 88 are attached at one end to each side of the end wall 20 and at the other end to the top of the nearest cornerpost 36 for preventing the end wall 20 from falling below the vehicle bed, for creating an access opening to the vehicle bed and for extending the vehicle bed when the vehicle bed storage extender is positioned over the tailgate 17.

The tops of the end wall 20 and the third wall 24 are fitted with means 92 for attaching a cargo net 90. A cargo net 90 is attached to the means 92 for attaching a cargo net 90 for securely retaining and protecting any cargo contained within the storage areas 70.

Means for securing the vehicle bed storage extender to the vehicle are attached to the vehicle bed storage extender. In the preferred embodiment the means for securing the vehicle bed storage extender to the vehicle are comprised of two tubes 94 with holes, two L-shaped rods 96 with holes and two pins 98. The holes in the tubes 94 and rods 96 are positioned to permit outward extension of the short arm of each rod 96 to selected positions as described below. One tube 94 is mounted to the lower end of the side wall face 36a of each cornerpost 36. The long arm of each L-shaped rod 96 with holes is sized to fit within the tubes 94. The long arm of one L-shaped rod 96 is inserted into each tube 94. Each L-shaped rod 96 is secured to each tube 94 with a pin 98.

When the vehicle bed storage extender is positioned over the vehicle tailgate 17, the short arm of each rod 96 is positioned to face down. The holes in each rod 96 and each tube 94 are aligned such that each rod 96 may be secured in a position wherein each L-shaped rod 96 will fit along a side of the lowered vehicle tailgate 17, thereby preventing side to side movement of the vehicle bed storage extender.

When the vehicle bed storage extender is positioned within an enclosed vehicle bed 56, the short arm of each rod 96 is positioned to face up thereby avoiding interference with the vehicle bed 56. The holes in each rod 96 and each tube 94 are aligned such that each rod 96 may be secured in a position wherein each L-shaped rod 96 will abut against a vehicle side panel 16, thereby preventing side to side movement of the vehicle bed storage extender.

Other means for securing the vehicle bed storage extender to the vehicle are known. For example, straps may be used to secure the vehicle bed storage extender to a lowered tailgate 17 or the vehicle storage bed 56. Pins may also be attached to the lower periphery of the vehicle bed storage extender which are configured to fit within latches contained within the tailgate 17.

Preferably, the end wall 20, second wall 22, third wall 24, first side wall subassembly 42 and the second side wall subassembly 46 are constructed from sheet metal for their frames and expanded metal. The cornerposts 36 are preferably constructed from sheet metal.

The invention has five modes of operation: extender mode, open bed extension mode, extender/storage mode, storage mode and forward storage mode.

FIG. 1 shows the vehicle bed storage extender when it is not in use. The dividers 68 are folded flat against the second wall 22. The second wall 22 and the third wall 24 are folded into the end wall 20. These walls are secured together by latch 76. Each second side wall subassembly 46 is folded into the first side wall subassembly 42 to which it is attached. Each side wall assembly 40 is folded adjacent and parallel to the folded end wall 20, second wall 22 and third wall 24 and secured by latch 78. The end wall 20, containing the second wall 22 and the third wall 24, is secured to the cornerposts 36 by the end wall brackets 62, the cornerpost locking pin brackets 64 and the end wall locking pins 66.

Figure 5:
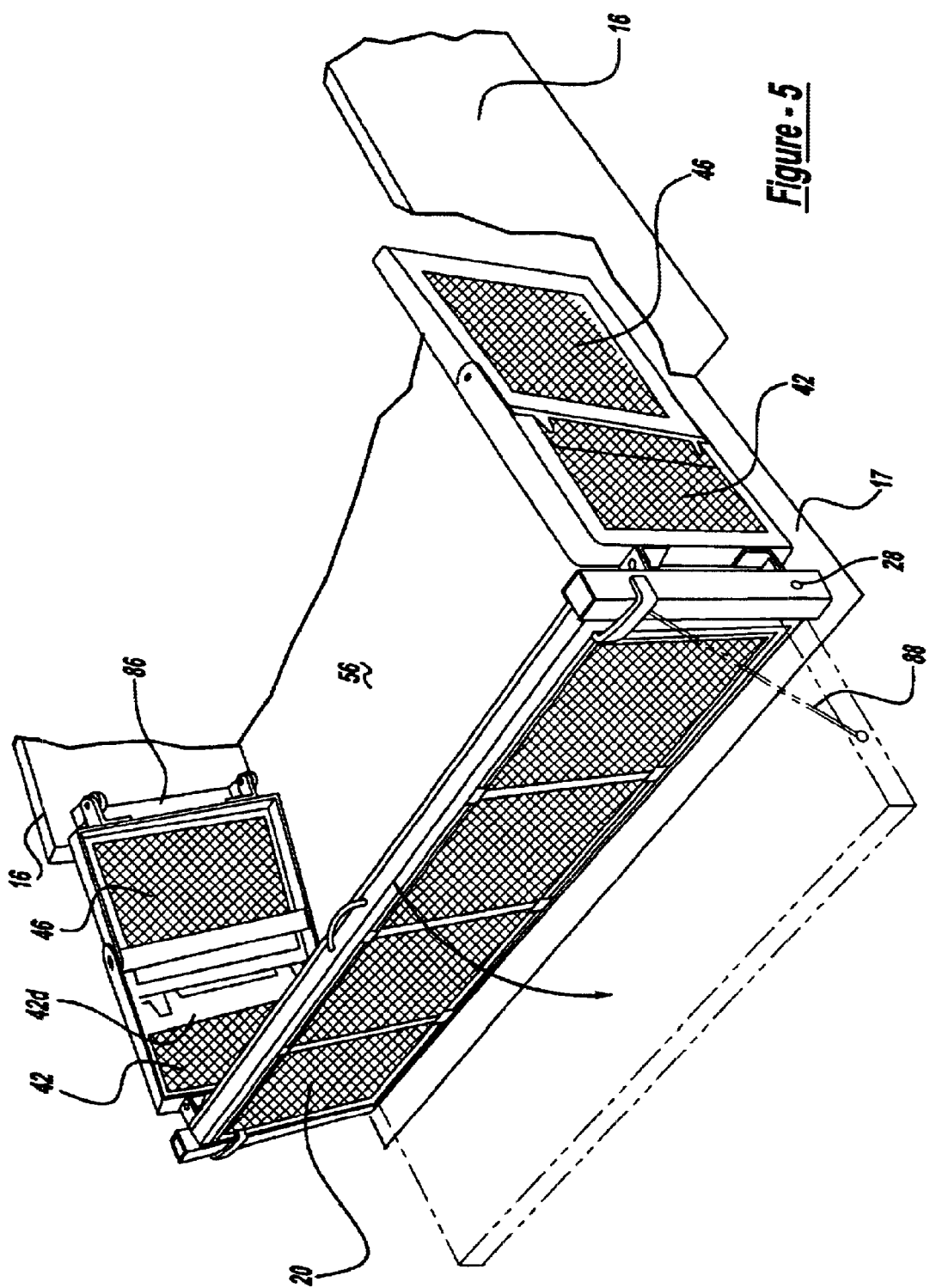
FIG. 5 is a perspective view of the vehicle bed storage extender of FIG. 1, positioned over the vehicle tailgate, oriented with its end wall rearward and its unfolded side walls mounted to the vehicle side panels.

FIG. 5 shows the vehicle bed storage extender in extender mode. To use the vehicle bed storage extender in extender mode, the tailgate 17 is placed into the down position. Each side wall assembly 40 is unlatched from the folded end wall 20, second wall 22 and third wall 24. Each second side wall subassembly 46 is then pivoted to form a side wall of the desired length and locked to its attached first side wall subassembly 42 by each Scans 60 for locking each first side wall subassembly to its attached second side wall subassembly. The end wall 20, containing the second wall 22 and the third wall 24, remains locked to the cornerposts 36 by the end wall brackets 62, cornerpost locking pin brackets 64 and end wall locking pins 66. The vehicle bed storage extender is then positioned over the tailgate 17 with the end wall 20 being positioned over the rearmost portion of the lowered tailgate 17. The second side wall assembly vehicle mounts 52 which are furthest from the cornerposts 36 are then attached to the means for engagingly accepting and securely retaining the second side wall subassembly vehicle mounts 86 which are mounted to the side panels 16 of the vehicle bed 56, forming an open top box vehicle bed extension as shown in FIG. 5.

The same procedure is used to employ the vehicle bed storage extender in open bed extension mode. Open bed extension mode is shown in FIG. 5 by the phantom horizontally positioned end wall 20. After the vehicle bed storage extender is positioned into extender mode over the tailgate, the end wall 20 is unlatched from the cornerposts 36 allowing it to swing down to form an extension to the tailgate 17. The end wall 20 is unlatched from the cornerposts 36 by pulling the end wall locking pins 66 out of the cornerpost locking pin brackets 64. The end wall 20 is held in position and prevented from dropping below horizontal by the support cords 88.

FIG. 6 shows the vehicle bed storage extender in extender/storage mode. To use the vehicle bed storage extender in extender/storage mode, the vehicle bed storage extender is first setup in extender mode as described above. The second wall 22 and the third wall 24 are then unlatched from the end wall 20 and unfolded so that the end wall 20, the second wall 22 and the third wall 24 form a U-shaped configuration. While in this configuration the third wall 24 is locked to the second side wall subassembly 46 by inserting the third wall locking pins 50 into the corresponding second side wall subassembly locking orifices 48. Each divider 68 is moved into an upright position forming an individual storage compartment over the tailgate. Each divider is locked to the end wall 20 and the third wall 24 by inserting the divider locking pins 72 into the corresponding end wall locking orifices 26 and the third wall locking orifices 32. The use of the dividers 68 is optional. Larger storage areas 70 may be created in the U-shaped configuration by leaving one or more dividers 68 in the down position.

FIG. 4 shows the vehicle bed storage extender in storage mode. To use the vehicle bed storage extender in storage mode, the tailgate 17 is placed into the up position. FIG. 4 shows the tailgate 17 in the down position in order to better illustrate how the vehicle bed storage extender is configured in this mode. Each side wall assembly 40 is unlatched from the folded end wall 20, second wall 22 and third wall 24. Each second side wall subassembly 46 is pivoted to form a side wall of the desired length and locked to its attached first side wall subassembly 42 by each means 60 for locking each first side wall subassembly to its attached second side wall subassembly. The optimum length of the side wall assembly is the length which will allow the vehicle bed storage extender, when used in storage mode, to use the maximum amount of space between the wheel wells and the raised tailgate. The second wall 22 and the third wall 24 are unlatched from the end wall 20 and unfolded so that the end wall 20, the second wall 22 and the third wall 24 form a U-shaped configuration. While in this configuration the third wall 24 is locked to the second side wall subassembly 46 by inserting the third wall locking pins 50 into the corresponding second side wall subassembly locking orifices 48. Each divider 68 is moved into an upright position forming an individual storage compartment 70. Each divider is locked to the end wall 20 and the third wall 24 by inserting the divider locking pins 72 into the corresponding end wall locking orifices 26 and the third wall locking orifices 32. The vehicle bed storage extender is positioned on the vehicle storage bed between the raised tailgate and the wheel wells, with the end wall 20 being positioned in close proximity to the wheel wells and forward of the third wall 24. The vehicle mounts 52 which are furthest from the cornerposts 36 are attached to the means for engagingly accepting and securely retaining the second side wall subassembly vehicle mounts 86 which are mounted to the rear ends of the side panels 16 of the vehicle bed 56, thereby forming multiple storage compartments on the vehicle storage bed 56 between the wheel wells 54 and the raised tailgate 17.

Optionally, the vehicle bed storage extender may be used in storage mode while the second wall 22, the third wall 24 and the dividers 68 remain folded into and latched adjacent to the end wall 20, as shown in FIG. 2.

FIG. 10 shows the vehicle bed storage extender in forward storage mode. The vehicle bed storage extender can be used in forward storage mode whenever the vehicle bed storage extender is configured in storage mode. When used in forward storage mode the vehicle bed storage extender creates a storage space at the front of the vehicle storage bed rather than between the wheel wells 54 and the raised tailgate 17. In this configuration, the means for engagingly accepting and securely retaining the second side wall subassembly vehicle mounts 86 are attached at the front of the vehicle storage bed. The second side wall subassembly vehicle mounts 52 which are furthest from the cornerposts 36 are then attached to the means for engagingly accepting and securely retaining the second side wall subassembly vehicle mounts 86 located at the front of the vehicle storage bed.

When the vehicle bed storage extender is used in extender/storage mode, storage mode or forward storage mode the dividers 68 may remain lowered. If the dividers remain lowered, one larger storage compartment is created rather than multiple smaller storage compartments.

The means 94, 96 and 98 for securing the vehicle bed storage extender to the vehicle are adjusted, as previously described, to prevent lateral movement of the vehicle bed storage extender.

Whenever the vehicle bed storage extender is configured such that one or more storage compartments are created between the end wall 20 and the third wall 24, a cargo net 90 may be attached to the means 92 for attaching a cargo net 90 attached to the end wall 20 and the third wall 24, thereby further securing and stabilizing any cargo placed within the storage areas.

The vehicle bed storage extender is secured to the vehicle by inserting a padlock 81 through each locking bracket 80 and the corresponding projection located near the middle of the means for engagingly accepting and securely retaining the second side wall subassembly vehicle mounts 86, in order to prevent theft of the vehicle bed storage extender.

What is claimed is:

1. A vehicle bed storage extender for use on a vehicle having a cab, a storage bed having a rear end, two side panels, a panel adjacent to the rear of the vehicle cab and a tailgate, the vehicle bed storage extender comprising:
   (a) an end wall;
   (b) two variable length side walls, each said side wall having one end for attaching to the end wall and a free end, said side walls being attached to the end wall to form a three sided open top box the open top box being sized to extend the bed of the vehicle when the tailgate is down;
   (c) one or more vehicle mounts attached to the free end of each said side wall for mounting to one or more of the panels of the vehicle;
   (d) a second wall pivotally connected to the end wall, sized to foldingly fit adjacent and parallel to the end wall; and
   (e) a third wall pivotally connected to the second wall, sized to foldingly fit adjacent and parallel to the second wall and the end wall, and further configured with the end wall, second wall and side walls to allow formation of a rectangular storage receptacle.

2. The vehicle bed storage extender as recited in claim 1, wherein the three sided open top box is sized to extend the bed of the vehicle when the tailgate is down and when the variable length side walls are extended to one position, and to provide full use of a storage space between vehicle wheel wells and the tailgate when the end wall of the three sided open top box is nearer the front of the vehicle bed, when the variable length side walls are extended to a second position.

3. The vehicle bed storage extender as recited in claim 1, wherein the side walls are pivotally attached to the end wall such that the side walls may be folded into a position parallel and adjacent to the end wall, thereby forming a compact easily storable structure.

4. The vehicle bed storage extender as recited in claim 1, further comprising a plurality of locking dividers pivotally attached to the second wall, such that the dividers may be folded into a position parallel and adjacent to the second wall when the dividers are not desired, and further providing storage areas when locked in a position perpendicular to the second wall.

5. The vehicle bed storage extender as recited in claim 1, wherein the end wall is pivotally attached to the bottom of each said side wall and detachable from the top of each said side wall, permitting the end wall to pivot into a position substantially coplanar with the vehicle tailgate when the tailgate is down, whereby the bed of the vehicle is extended.

6. A vehicle bed storage extender for use on a vehicle having a cab, a storage bed having a rear end, two side panels, a panel adjacent to the rear of the vehicle cab and a tailgate the vehicle bed storage extender comprising:
   (a) an end wall;
   (b) two dual length side walls, each said side wall having one end for attaching to the end wall and a free end, said side walls being attached to the end wall to form a three sided open top box, the open top box being sized to extend the bed of the vehicle when the tailgate is down, and to provide a storage area on the vehicle bed when the tailgate is up;
   (c) one or more vehicle mounts attached to the free end of each said side wall for mounting to one or more of the panels of the vehicle;
   (d) a second wall pivotally connected to the end wall, sized to foldingly fit adjacent and parallel to the end wall; and
   (e) a third wall pivotally connected to the second wall, sized to foldingly fit adjacent and parallel to the second wall and the end wall, and farther configured with the end wall, second wall and side walls to allow formation of a rectangular storage receptacle.

7. The vehicle bed storage extender as recited in claim 6, wherein the side walls are pivotally attached to the end wall such that the side walls may be folded into a position parallel and adjacent to the end wall, thereby forming a compact easily storable structure.

8. The vehicle bed storage extender as recited in claim 7, further comprising a plurality of locking dividers pivotally attached to the second wall, such that the dividers may be folded into a position parallel and adjacent to the second wall when the dividers are not desired, and further providing storage areas when locked in a position perpendicular to the second wall.

9. The vehicle bed storage extender as recited in claim 8, wherein the end wall is pivotally attached to the bottom of each said side wall and detachable from the top of each said side wall, permitting the end wall to pivot into a position substantially coplanar with the vehicle tailgate when the tailgate is down, whereby the bed of the vehicle is extended.

10. The vehicle bed storage extender as recited in claim 7, wherein the end wall is pivotally attached to the bottom of each said side wall and detachable from the top of each said side wall, permitting the end wall to pivot into a position substantially coplanar with the vehicle tailgate when the tailgate is down, whereby the bed of the vehicle is extended.

11. The vehicle bed storage extender as recited in claim 6, wherein the end wall is pivotally attached to the bottom of each said side wall and detachable from the top of each said side wall, permitting the end wall to pivot into a position substantially coplanar with the vehicle tailgate when the tailgate is down, whereby the bed of the vehicle is extended.

12. A vehicle bed storage extender for use on a vehicle having a cab, a storage bed having a rear end, two side panels, a panel adjacent to the rear of the vehicle cab and a tailgate, the vehicle bed storage extender comprising:
   (a) two cornerposts each having a top, a bottom, a side wall face, a back face and an end wall face;
   (b) an end wall rotatably connected to the bottoms of the end wall face of each said cornerpost;
   (c) two side wall assemblies each pivotally attached to the side wall face of each said respective cornerpost, each said side wall assembly comprising:
      (i) a first side wall subassembly;
      (ii) a second side wall subassembly, having two vertical wall flanges, the second side wall subassembly being sized and pivotally attached to the first side wall subassembly such that each of the two side wall assemblies is capable of having two distinct lengths when the end wall and the first and second side wall assemblies are configured as a three sided open top box;

(iii) one or more vehicle mounts attached to each said vertical wall flange of each said second side wall subassembly;

(iv) means for locking the first side wall subassembly to the second side wall subassembly of each of said two side wall assemblies to form a locked wall; and (d) means for locking the end wall to the end wall face of each said cornerpost when the end wall and side wall assemblies are configured as the three sided open top box.

13. The vehicle bed storage extender as recited in claim 12, further comprising:

(a) a second wall pivotally connected to the end wall, sized to foldingly fit adjacent and parallel to the end wall; and (b) a third wall pivotally connected to the second wall, sized to foldingly fit adjacent and parallel to the second wall and the end wall, and further configured with the end wall, second wall and side wall assemblies to allow formation of a rectangular storage receptacle.

14. The vehicle bed storage extender as recited in claim 13, further comprising a plurality of locking dividers pivotally attached to the second wall, such that the dividers may be folded into a position parallel and adjacent to the second wall when the dividers are not desired, and further providing storage areas when locked in a position perpendicular to the second wall.

* * * * *